Oct. 27, 1953     O. E. HINTZ     2,656,670
PICKUP MECHANISM
Filed June 30, 1951
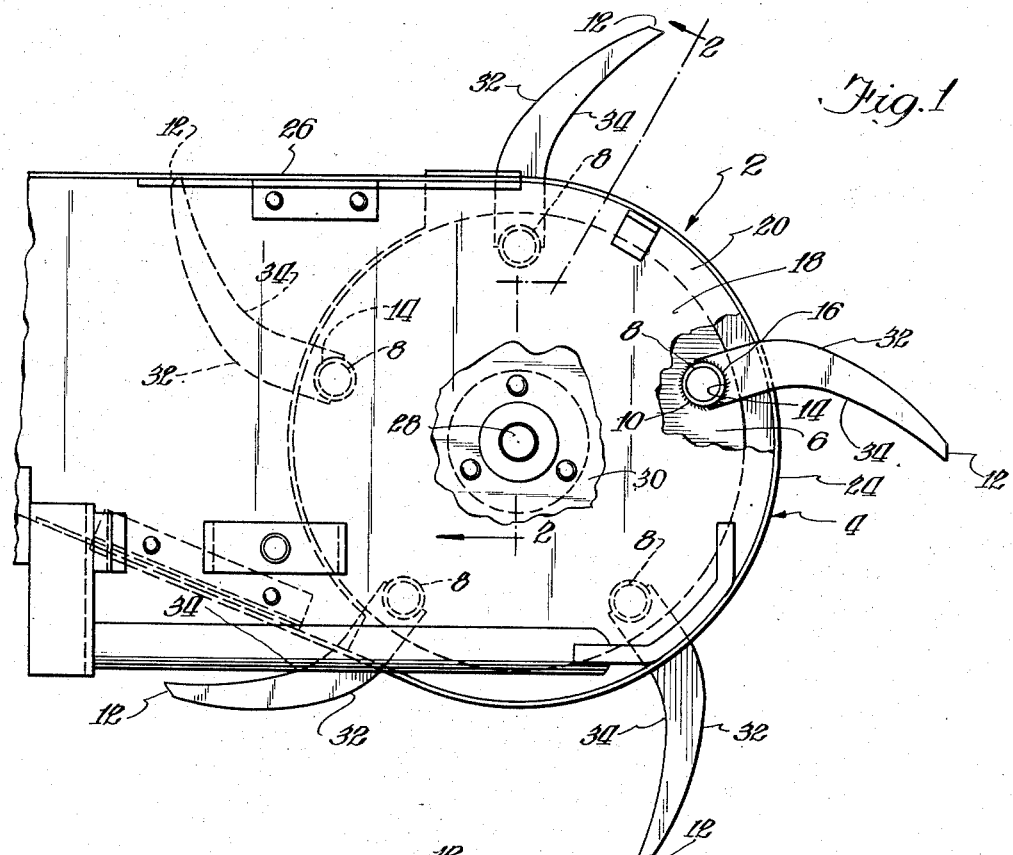
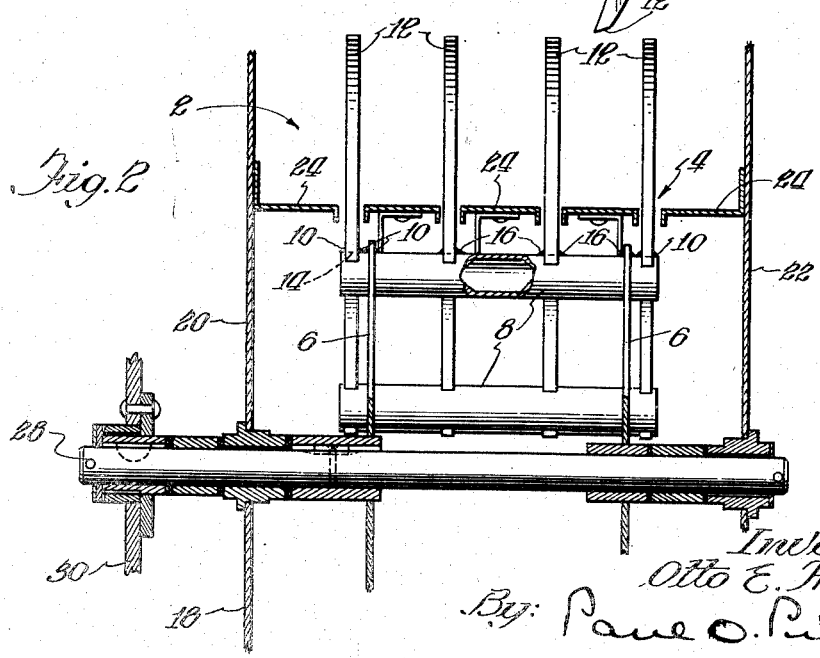
Inventor:
Otto E. Hintz
By: Paul O. Pippel
Attorney.

Patented Oct. 27, 1953

2,656,670

UNITED STATES PATENT OFFICE 2,656,670

PICKUP MECHANISM

Otto E. Hintz, Riverside, Ill., assignor to International Harvester Company, a corporation of New Jersey Application June 30, 1951, Serial No. 234,489

1 Claim. (Cl. 56—364)

This invention relates to a novel pick-up for crop harvesters.

A general object is to provide a novel, rugged pick-up having relatively few moving parts with a view towards reducing manufacturing costs and improving the useful life of the mechanism.

A more specific object is to design a pick-up including a rotatable drum structure with a plurality of outstanding fingers which are adapted to lift the crop onto a deck formed by a plurality of strippers interdigitated with the fingers, the fingers being of rigid construction and fixedly secured to the drum and each presenting an involute leading edge arranged in such manner as to cross at an angle of at least 90° between the strippers when disappearing through the deck and thereby positively preclude pinching the crop against the deck and at the same time presenting an effective area for shoving the crop towards the back of the deck.

A further object is to design a finger with a leading edge having sliding contact with the crop when withdrawing therefrom while at the same time imposing substantially maximum pushing force on the load, and a trailing edge which effectively clears the oncoming load therebehind.

These and other objects of the invention will become more apparent from the specification and the drawings wherein:

Figure 1 is a side elevational view of the mechanism with the foreground paneling partly broken away to more clearly illustrate the invention, and Figure 2 is a fragmentary transverse sectional view taken substantially in the vertical planes indicated by the lines 2—2 of Figure 1.

Describing the invention in detail, the pick-up mechanism generally indicated 2 comprises a drum structure 4 including an annular plate 6 at each end, the plates being interconnected at their outer peripheries at preferably regularly circumferentially spaced points by a plurality of cylindrical cross-bars or tubes 8, the bars or members 8 extending through complementary transverse openings in the plates and weld-connected to the plates around the openings as at 10.

Each bar 8 carries on its outer side a plurality of fingers or tangs 12, 12 spaced axially thereon and extending radially outwardly thereof. Each finger element has a semi-circular cut-out or concavity 14 at the inner extremity of its root portion complementally fitted against the periphery of the associated support tube and weld-connected thereto as at 16.

The drum 4 is encased within a housing 18 which comprises a pair of side panels or ambulant supports 20 and 22 of the mobile harvester mechanism receiving the drum therebetween, and a plurality of generally parallel stripping elements 24, 24 between said panels and spaced axially of the drum and at their lower ends extending from inwardly of the drum and passing beneath the drum and around the forward side and top of the drum and then extending rearwardly thereof. The stripper elements 24, 24 are connected with the side elements 20 and 22 and are intercalated with the fingers 12, 12 and above the drum form a slotted platform or deck generally designated 26 and which is substantially horizontally positioned and at its inner discharge end extends over a suitable conveyor means (not shown) for delivery to the processing mechanism such as will be readily understood by those skilled in the art. The strippers may be conveniently secured to the panelling of the harvester in conventional manner as by cross braces which clear the fingers. The drum is keyed and mounted on a shaft 28 extending through the centers of the plate 6, 6 and journaled adjacent each end from the adjacent panel 20 or 22 and driven as by a sprocket 30 keyed to the shaft.

Each finger or tine 12 is curved or raked back with respect to the direction of rotation of the drum to permit its easy withdrawal from the crop.

In operation, the drum rotates in a direction (counter-clockwise Figure 1) to effect a picking action on the crop by the fingers which lift the crop in front of the pick-up off the ground and deposit it on the deck 26. It will be noted that the leading edge 32 of each finger is an involute convex curve such that at all points thereof it forms an angle of substantially 90° with the plane of the portions of the top side of the deck 26 in advance thereof as the drum is being rotated and the finger is moved towards the rear end of the deck while it disappears therethrough. It will be readily observed that this feature not only prevents pinching of the crop against the deck but also presents an effective area on each tooth 12 to push the load towards the rear of the platform while at the same time, and especially by making the trailing edge 34 of each tooth as an involute concave curve and arranging the curvature of the trailing edge in such manner that it converges with the leading edge towards the outer tip end of the tooth to provide a taper, the tooth is afforded easy withdrawal from the crop. The trailing edge is so arranged as to form a constantly increasing angle with the portion of the deck trailing therebehind as the finger moves towards the rear of the deck and disappears therethrough. This effectively disengages the finger from the crop and also provides maximum space for the oncoming crop load therebehind. It will be seen from a consideration of Figure 1 that the root portion of each finger 12 is of substantially constant width and that the leading and trailing edges thereof are generally parallel and merge at their outer ends into the inner ends of the leading and trailing edges 32 and 34 respectively. Thus, each finger is of substantial width at its root to afford sufficient strength and narrow in the direction of travel with generally flat opposite sides to insure easy withdrawal from the crop. Furthermore, the relative thinness of the fingers 12 permits closer spacing of the slots 24, 24 so that the slots defined therebetween are of minimum width whereby minimizing the crop falling into the slots and fouling the mechanism.

What is claimed is:

In a crop pick-up, ambulant support means, a pick-up drum journalled therefrom and comprising a plurality of outstanding fingers, a plurality of stripper elements carried by said support means and wrapped about said drum in intercalated relationship with said fingers and providing a crop deck lying in a single plane, each finger adapted to sweep through said deck attendant to rotation of said drum and each finger having a convexly curved leading edge and a concave trailing edge, said leading edge defined by an arc having an angle of intersection at each point thereof substantially 90° with said plane of said deck, and said trailing edge defined by an arc of progressively increasing angle of intersection with said plane of said deck commencing above 90° as the related finger passes through said deck.

OTTO E. HINTZ.

References Cited in the file of this patent

UNITED STATES PATENTS

| Number | Name | Date |
|---|---|---|
| 264,570 | Scafe | Sept. 19, 1882 |
| 282,762 | Packer | Aug. 7, 1883 |
| 738,284 | Bortree | Sept. 8, 1903 |
| 1,891,748 | Clove | Dec. 20, 1932 |
| 2,362,861 | Russell | Nov. 14, 1944 |

FOREIGN PATENTS

| Number | Country | Date |
|---|---|---|
| 4,800 | Great Britain | Dec. 12, 1876 |
| 23,716 | Great Britain | Nov. 22, 1901 |